United States Patent [19]

Furuoya

[11] 3,737,882

[45] June 5, 1973

[54] CYLINDRICAL MAGNETIC DOMAIN MEMORY APPARATUS

[75] Inventor: Takashi Furuoya, Tokyo, Japan

[73] Assignee: Nippon Electric Company, Limited, Tokyo-to, Japan

[22] Filed: Jan. 28, 1972

[21] Appl. No.: 221,699

[30] Foreign Application Priority Data

Feb. 6, 1971 Japan ..................................46/4811

[52] U.S. Cl. ...................340/174 TF, 340/174 EB, 340/174 HA, 340/174 SR

[51] Int. Cl. ............................................G11c 11/14

[58] Field of Search .................................340/174 TF

[56] References Cited

OTHER PUBLICATIONS

Scientific American – June 1971, pg. 78–90.

*Primary Examiner*—James W. Moffitt

*Attorney*—Richard C. Sughrue, Gideon Franklin Rothwell, Darryl Mexic et al.

[57] ABSTRACT

A cylindrical magnetic domain memory having a plurality of storage channels which can be written into via one domain generating source and read-out from via one domain detecting means without any relative time loss due to the distance of the storage channel from the detecting or generating means. Each storage channel circulates the bubbles therein continuously along a closed path. A magnetic switch, when actuated, forces an alteration in said closed path so that a circulating bubble comes near enough to a string of closely packed bubbles in a read-out channel of a magnetic domain transfer line. This creates a repulsive force on the string of bubbles causing the bubble at the very end of the read-out channel to be forced into the bubble detector. A separate string of closely packed bubbles appears in the write-in channel of the magnetic domain transfer line. New information is written into a selected storage channel by closing a magnetic switch associated with the selected channel and forcing the nearest of said string of bubbles through said switch into said storage channel. The force required is provided by generating a bubble and inserting it at one end of said write-in channel, thereby causing sequential repulsion between adjacent bubbles in said string.

10 Claims, 7 Drawing Figures

Patented June 5, 1973 3,737,882

3 Sheets-Sheet 3

CYLINDRICAL MAGNETIC DOMAIN MEMORY APPARATUS

BACKGROUND OF THE INVENTION

The present invention is in the field of magnetic domain memories, and more specifically is an information storage means using cylindrical magnetic domains which are generated in orthoferrites or similar magnetic materials. This invention is applicable to information processing systems such as electronic computers and electronic telephone exchange equipment.

It has been known that the use of cylindrical magnetic domains (hereinafter referred to as "bubbles") generated in certain types of magnetic materials, e.g., the so-called orthoferrites containing rare earth elements or various types of garnet can be used to perform logic and memory operations. For example, in a paper entitled "Application of Orthoferrites to Domain Wall Devices" appearing in "IEEE TRANSACTIONS ON MAGNETICS," VOL. MAG-5, No. 3, SEPTEMBER issue, 1969, Pages 544 to 553, A.H. Bobeck, it is pointed out that, when a piece of single crystal consisting of orthoferrites is cut out perpendicularly to the easy axis and a DC magnetic field having suitable magnitude is perpendicularly applied to the single crystal piece from outside, bubbles can stably stay within the crystals and be freely moved therein providing a slight magnetic field gradient. Due to this phenomenon, the binary information "1" and "0" can be made to correspond to the presence and absence of the bubbles, respectively. Also, the transfer of the binary information can be made to correspond to the movement of bubbles. Moreover, a repelling force appears between bubbles which are separated by less than a certain distance, and the movement of the bubbles can be controlled by using the repelling force.

Memories of various forms employing cylindrical magnetic domains have been suggested. For instance, such forms include binary information storing means wherein two stable points for a magnetic domain are provided to store the binary information depending on which stable point the domain occupies, and a method wherein an array of magnetic domains corresponding to binary information are successively transferred along a particular transfer line such as a shift register. For instance, the latter method is disclosed in the U.S. Pat. No. 3,460,116 (particularly, FIG. 1) issued Aug. 5, 1969.

Where a memory is constructed in accordance with the latter technique, one information storing channel corresponds to one track of a conventional magnetic disc or drum. Accordingly, a memory capable of performing sequential access operation equivalent to the magnetic disc and drum can be made by using a plurality of information storing channels. A memory constructed in this fashion has an advantage over the disc or drum because the absence of mechanical parts results in improved maintainability, stability and reliability.

In such storage equipment using bubbles, the input information is generated by a bubble generating source, and the bubbles are transferred to an information storing channel wherein they are retained to represent the stored information. In addition, the detection of information is carried out in such a manner that a bubble detector, such as a Hall element or a magnetoresistance element, is similarly disposed within the channel or coupled thereto, and the bubbles are sequentially transferred to the detector. As a result, if a generating source and the detector are employed for each information storing channel and the storing channels are arranged analagous to the tracks on a drum, an external memory having the same characteristics as those of the prior art magnetic disc and drum is obtained.

However, in the above-mentioned storage equipment a number of (the number equal to the number of tracks) generating sources, detectors and peripheral circuits is required since one generating source, one detector and one peripheral circuit must be disposed corresponding to each information storing channel. In addition, wirings process must be performed for the respective peripheral elements (the generating sources and the detectors). For this reason, the structure of the latter mentioned storage equipment is complicated. Also, these facts bring out disadvantageous conditions in reliability and cost.

To avoid the above disadvantages, a further prior art method has been adopted wherein a transfer line for bubbles is formed, a plurality of information storage channels are coupled to the transfer line, and a single generating source and detector are disposed at an end of the line. Moreover, switching means for controlling the movement of the bubbles are employed at the coupling portions between the respective information storage channels and the transfer line. As a result, when a desired and designated information storage channel is selected, the bubbles enter from the transfer line into the channel (write-in) or they are transferred from the channel to the transfer line (read out). Thus, any of the several information storing channels can be selected by the switching means for write-in or read-out operation.

As an example, FIG. 1 shows the main parts of a cylindrical magnetic domain memory apparatus disclosed in the U.S. Pat. No. 3,508,225 issued to J.L. Smith on Apr. 21, 1970. In FIG. 1, numeral 1 shows a transfer line and a bubble generating and detecting means 5 composed of a conductor loop is disposed at a part of the transfer line 1. Information storing channels 2 are coupled to the line 1 through magnetic domain movement control switches 3 and 4 as mentioned above. In such storage equipment, when information in a desired channel is to be read out, the switches 3 and 4, associated with the desired channel, are closed to transfer bubbles from the selected channel 2 to the detecting means 5. For example, when information of the uppermost information storing channel in FIG. 1 is read out, bubbles are moved along the path shown by one dot and dash line to pass through the detecting means 5. The bubbles, once read out, can be restored into the previous channel as they are. The write-in operation can be carried out such that bubbles generated by the generating source 5 are fed into the designated channel one by one along the path shown by the one dot-and-dash line. As is apparent from the foregoing, with such method, fewer peripheral elements and circuits are needed thus making an economical device possible.

As is well known, however, moving means for the bubbles moves them successively step by step. For example, as shown in FIG. 5A of the U.S. Pat. No. 3,534,347 published on Oct. 13, 1970, in the T.I-bar system in which T-shaped and I-shaped patterns are alternately arranged on a single crystal piece consisting of a soft magnetic material, the bubbles are moved along the arrangement of the T.I-bars by applying a rotating magnetic field parallel to the single crystal face. At every rotation of the rotating magnetic field, the bubble is moved from the T-shaped pattern to an adjacent T-shaped pattern. Consequently, according to such method, the number of steps of moving the bubbles from an information storing channel to a detecting means or the number of steps of feeding the bubbles from the generating means into the channel becomes very large, resulting in a great loss in time. In addition, since the distances between the detecting and generating means and the respective information storing channels are different, the access time for channel closer to the detecting and generating means is shorter, whereas the access time for the channel more distant therefrom is longer. Therefore, such a conventional storage equipment is very difficult to handle.

SUMMARY OF THE INVENTION

It is, therefore, one object of this invention to provide a cylindrical magnetic domain memory apparatus which is free from the above-mentioned disadvantages and which accomplishes a high operating speed and a low cost. More specifically, the present invention is a low cost memory apparatus in which the number of elements required for read-out and write-in operations are widely reduced and peripheral circuits for driving and detecting operation are considerably saved by the use of the present invention. Additionally, the time lag due to an information transfer line is made near zero, whereby the access time can be much shortened and all the information storing channels can operate at an identical access time.

A cylindrical magnetic domain memory apparatus according to the present invention comprises a sheet of magnetic material capable of retaining bubbles; a plurality of information storing channels which are arranged on the sheet of magnetic material and each of which consists of a first predetermined arrangement of thin film patterns for forming a path for causing bubbles, corresponding to storage information, to normally and sequentially circulate within a loop; means for generating a magnetic field rotating within a plane of the sheet of magnetic material in order to cause the bubbles to normally circulate within the loops of the information storing channels; a magnetic domain transfer line which is arranged on the sheet of magnetic material, which is common to the channels, and which consists of second and third predetermined arrangements of thin film patterns, each of the arrangements forming a row and normally retaining bubbles; means for supplying bubbles to the third predetermined arrangement of thin film patterns simultaneously when one of the domains disappears; and write-in and read-out means for introducing bubbles corresponding to desired information into a desired one of the information storing channels, and for reading out bubbles corresponding to the information from the desired one of the channels, whereby simultaneously when one bubble to be written in is applied in response to a write-in operation of the write-in means to the thin film pattern at one end of said second predetermined arrangement of thin film patterns forming the magnetic domain transfer line, the bubble to be written in is introduced into the desired channel due to a repulsion between the bubble present at said thin film pattern at the one end and the bubble to be written in, and whereby as soon as one bubble to be read out is in response to a read-out operation of the read-out means from the desired channel to the vicinity of a thin film pattern among said third predetermined arrangement of thin film patterns which is located at a position corresponding to the desired channel, the bubble is read out from the desired channel into the read-out means due to a repulsion between the bubble to be read out and the bubble present at the thin film pattern at said position corresponding to the desired channel.

DETAILED DESCRIPTION

Figures 1, 2, 3:
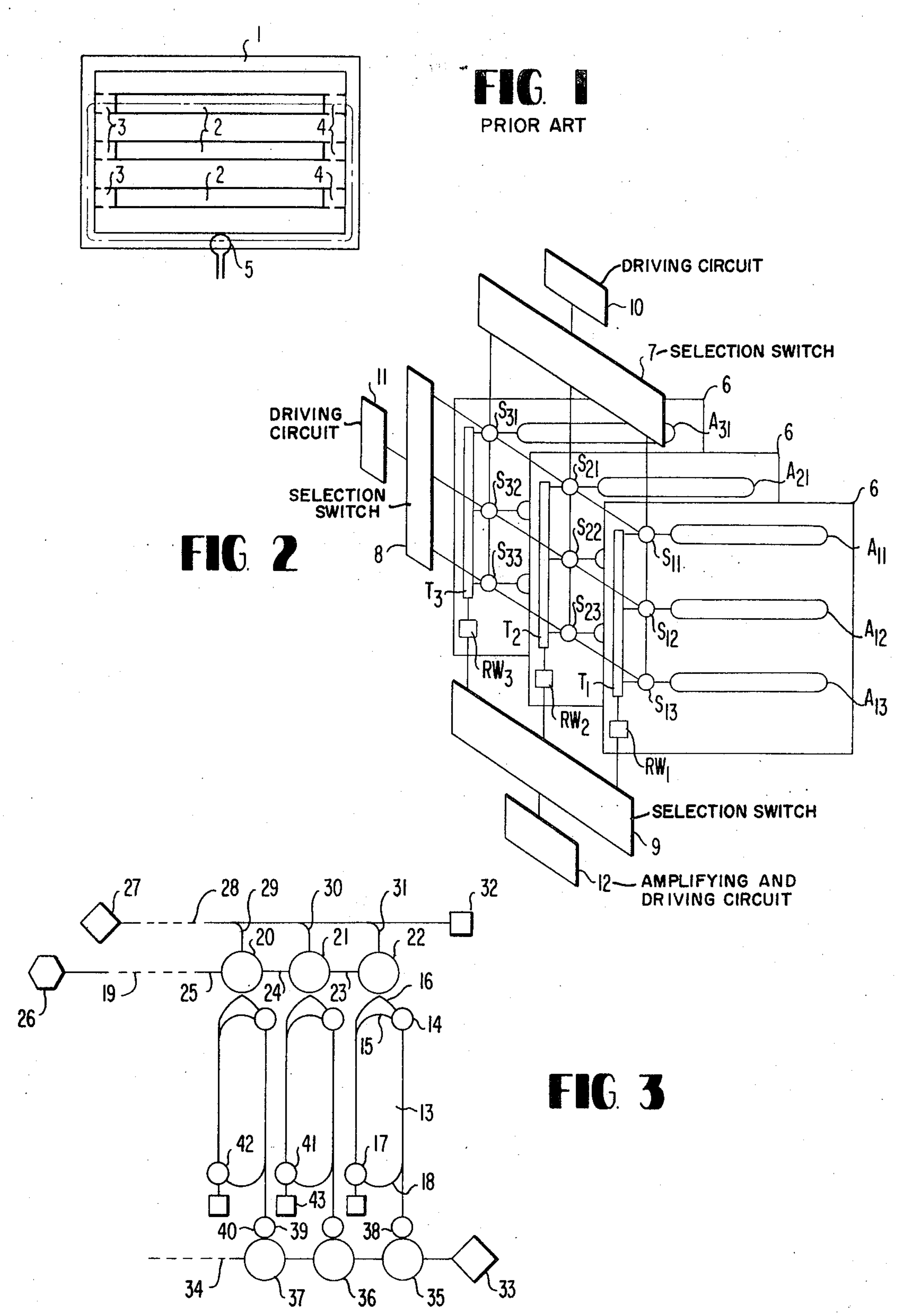
FIG. 1 PRIOR ART, FIG. 2, FIG. 3
FIG. 1 shows a conventional memory apparatus using cylindrical magnetic domains.
FIG. 2 shows a diagram of a structure of the present invention, and in particular, shows the relationship between the magnetic domain movement control switches, the magnetic domain transfer channels, and the information storing channels.
FIG. 3 shows a diagram of one embodiment of the present invention.

In FIG. 2 which shows a block diagram of a structure of the present invention, the cylindrical magnetic domain memory apparatus is composed of a plurality of single crystal pieces 6, a plurality of information storing channels $A_{11}$, $A_{12}$, $A_{13}$, . . . and $A_{31}$, (all of said storing channels being generally designated herein as $A_{ij}$) a plurality of magnetic domain transfer lines $T_1$, $T_2$ and $T_3$, (all of said transfer lines being generally designated $T_i$) a plurality of magnetic domain generating and detecting means $RW_1$, $RW_2$ and $RW_3$, a plurality of switches $S_{11}$, $S_{12}$, $S_{13}$, . . . and $S_{33}$, (all of said switches being generally designated $S_{ij}$) a Y-selection switch 7, an X-selection switch 8, a sense selection switch 9, a Y-driving circuit 10, an X-driving circuit 11 and a sense amplifying and write-in driving circuit 12. In FIG. 2, only nine information storing channels are shown for clarification of the drawing. Reference character A designates the information storing channels respectively used corresponding to the single crystal pieces 6, while suffixes thereof represent numbers for specifying the respective channels. For example, $A_{22}$ represents the second information storing channel from the top formed on the second single crystal piece 6. The magnetic domain movement control switch $S_{ij}$ is connected to an end of the information storing channel $A_{ij}$. The switch $S_{ij}$ equivalently changes passages of cylindrical magnetic domains. Also, the magnetic domain transfer line $T_i$ is formed on an end of each piece 6. The channels $A_{11}$ , $A_{12}$ and $A_{13}$ formed on the same piece 6 are coupled through the respective switches $S_{11}$, $S_{12}$ and $S_{13}$ to the transfer line $T_1$. The magnetic domain generating and detecting means $RW_1$ is coupled to the magnetic domain transfer line $T_1$ at an end thereof. For this reason, the means $RW_1$ is capable of performing write-in and read-out operation of information for any one of the storing channels $A_{11}$, $A_{12}$ and $A_{13}$ through the switches $S_{11}$, $S_{12}$ and $S_{13}$, respectively.

On the other hand, the switch $S_{ij}$ is electrically connected to the Y-selection switch 7 and the X-selection switch 8 in the matrix form. The selection switches 7 and 8 are respectively connected to the Y-driving circuit 10 and the X-driving circuit 11. The characteristics of the switches $S_{ij}$ are determined so that they are not actuated by the application of only the X-driving current or Y-driving current but by the application of the X- and Y-driving currents simultaneously. Accordingly, a desired switch $S_{ij}$ is selected and is made operable by the designations of the *i*-th address of the Y-selection 7 switch and the *j*-th address of the X-selection switch 8. The magnetic domain generating and detecting means $RW_1$, $RW_2$, and $RW_3$ are similarly connected through the sense selection switch 9 to the sense amplifying and write-in driving circuit 12. The switch 9 is adapted to connect and disconnect the same address as that of the Y-selection switch 7. For instance, in the case where the channel $A_{23}$ is selected to perform the information transfer or receipt operation, the channel $A_{23}$ is selected by connecting the second address of the Y-selection switch 7, the third one of the X-selection switch 8 and the second one of the sense selection switch 9. When the information write-in operation is performed, the pulse current of the write-in driving circuit 12 is applied to the means $RW_2$ to generate a group of magnetic domains corresponding to the information. The information is received into the loop $A_{23}$ through the transfer line $T_2$. In contrast, when the information read-out operation is carried out, the information is transferred from the channel $A_{23}$ through the switch $S_{23}$ and transfer line $T_2$ into the means $RW_2$. The means $RW_2$ converts the information into an electric signal. The electrical signal is supplied through the sense selection switch 9 to the sense amplifier 12 to be amplified therein.

As has been mentioned above, the description of the structure of the invention has been given for the case where the memory apparatus has 9 information storing channels. In addition, as is apparent from the description, one characteristic feature of the present invention resides in that the switch $S_{ij}$ corresponding to the channel $A_{ij}$ is selected by the X- and Y-selection switches 8 and 7, and that the channel $A_{ij}$ is coupled to the magnetic domain transfer line $T_i$ having the magnetic domain generating or detecting means or the magnetic domain generating and detecting means at its end. Consequently, with such apparatus, the selecting circuits and the magnetic domain generating and/or detecting means for the respective channels, etc., can be extensively dispensed with, and a memory apparatus can be realized at a low cost of manufacture.

In order to accomplish the second characteristic feature of the present invention or, in other words, in order to shorten the access time, the magnetic domain transfer line $T_i$ and the magnetic domain movement control switch $S_{ij}$ are constructed as follows. The transfer line $T_i$ is filled with magnetic domains at all the steps (for example, in the case of a T.I-bar system, a unit by which the magnetic domain is moved by one period of rotating magnetic field signifies one step). In a case where magnetic domains are read out through the switch $S_{ij}$, the domains are not passed through the transfer line $T_i$ to the means $RW_i$ one by one, but domains are introduced into the means $RW_i$ in such a way that the domains filled in the line $T_i$ are immediately pushed out. In this manner, the information transfer time in the transfer line $T_i$ can be substantially made zero. As a result, as soon as the magnetic domain is entered from the channel through the switch $S_{ij}$ into the line $T_i$, the domain is introduced into the means $RW_i$. By employing such transfer line $T_i$, the transfer time can be similarly made zero in the information write-in operation. In addition, the write-in and read-out time can be made equal in principle for both the information storing channel close to the means $RW_i$ and the channel distant from the means $RW_i$. A circuit similar to this transfer line has been reported as a compressor circuit, in a paper entitled "Applications of Bubble Devices" appearing in "IEEE TRANSACTIONS ON MAGNETICS", Vol. MAG-6, No. 3, September issue, 1970, Pages 447 to 451 (in particular, Page 450). In the prior art, however, bubbles are transferred and received merely at both ends of the circuit. In the novel circuit using T.I-bars disposed according to the present invention stated below, magnetic domains are transferred and received not only at both the ends of the compressor circuit, but also at intermediate portions. Therefore, it is possible to couple a number of information storing channels to one compressor circuit.

Furthermore, the magnetic domain movement control switch $S_{ij}$ not feeds bubbles from the channel $A_{ij}$ to the transfer line $T_i$, but operates so that when a magnetic domain circulating within the storing channel comes close to the transfer line, it exerts a repelling influence upon the string of bubbles filled in the line, thereby moving the bubbles in a direction to introduce one into $RW_i$. It has been described in the foregoing that, when two bubbles come close within a certain distance, a repelling force is exerted between them. By the use of novel T.I-bar circuit of the present invention, it becomes possible to constitute a group of switches having the above-mentioned property due to the repelling force. As a result, if such magnetic domain movement control switches are employed, quite unlike the conventional equipment wherein bubbles are taken out of or entered into information storing channels, the magnetic domains within the channels can normally circulate without destroying information contents, and the information can be read indirectly. Accordingly, the information is not destroyed at the read-out operation. In addition, complicated operations such as a rewrite-in operation for preventing information from being destroyed become unnecessary.

In FIG. 3 which shows one embodiment of the invention, and particularly shows a diagram for diagrammatically representing the relation between the above-mentioned magnetic domain movement control switch $S_{ij}$, the magnetic domain transfer channel $T_i$ and the information storing channel $A_{ij}$. There are three information channels 13 shown. Each storage channel has associated with it three magnetic switches, e.g., read-out switch 14, write-in switch 38, and erase switch 17. The transfer line for the storage channels shown comprises two separate channels, read-out channel 19 and write-in channel 34. Read-out channel 19 comprises a plurality of small closed magnetic paths 20, 21 and 22 connected to paths 25, 24; paths 24, 23; and path 23, respectively, and a bubble detector 26. A bubble generator 27 provides bubbles to each area 20, 21, 22, etc., via circuit 28 and branches 29, 30, 31. A bubble absorber 32 is at the end of circuit 28. Write-in channel 34 comprises a plurality of small closed magnetic paths 35, 36, 37, and bubble generator 33. Referring to the storage channel 13 on the right, in the absence of read or write operation, the bubbles in the storage channel circulate counter-clockwise under the influence of a counter-clockwise rotating field along the path 18, 14, 15, 17, 18, etc.

For read-out operation each closed path 20, 21, 22 of the read-out channel will have a bubble therein. This is insured by the operation of generator 27 and associated circuitry. As the field rotates these bubbles stay within their respective closed paths. The entire group of bubbles in the read-out channel provides a closely stacked string of bubbles. To read out information stored in channel 13, switch 14 is actuated to effectively alter the circulation path in the storage channel. The circulating bubbles now traverse along path 16 rather than 15 bringing them near enough to the read-out channel to exert a repelling force on the bubbles in the closed path, e.g., path 22. The bubble from path 22 is repelled and caused to jump to path 21; the bubble previously in 21 is thereby repelled and caused to jump to path 20; etc., and the bubble at the closed path on the far left of the read-out channel is thereby forced into the detector 26. There it can be seen that when switch 14 of any selected storage channel is actuated, each time a bubble in the storage channel reaches the apex of path 16, a bubble from the read-out channel will be forced into the detector. The write-in operation is essentially the reverse of the read-out operation. Here, bubbles are forced from the write-in channel into the selected storage channel via an actuated write-in switch, e.g., switch 38. At the same time the erase switch, e.g., switch 17, is also actuated to transfer the existing information into the bubble absorber 43.

One problem suggested in the read-out operation herein is that, after the magnetic domain is pushed out from the path 22, no magnetic domain is present in the path 22. As a result, when the next domain appears at the pointed end of the branch circuit 16 subsequently, such read-out operation can be performed no longer in that condition. However, the problem is solved by arranging, as shown in FIG. 3, the magnetic domain generating source 27, the path 28, the branch circuits 29 through 31 and the absorbing source 32. More specifically, magnetic domains are normally and continuously generated from the source 27, and the domains are caused to run on the path 28 in sequential manner by every step. When the magnetic domain has disappeared from the path 22, no repelling force is exerted against the passage of a magnetic domain through the branch line 31, and hence, the domain passing along the path 28 can enter into the path 22 through the branch circuit 31. Therefore, when the magnetic domain is exhausted from the path 22, another domain in place of the exhausted domain can be filled into the path 22 through the branch line 31 at latest while the magnetic domains move by one step.

As is apparent from the foregoing, when the transfer line of the present invention is used, a magnetic domain in equivalently fed into the line from any intermediate positions thereof in comparison with the prior-art compressor circuit. Therefore, the transfer line of the invention makes it possible to detect the magnetic domain without causing any time delay.

Figure 5:
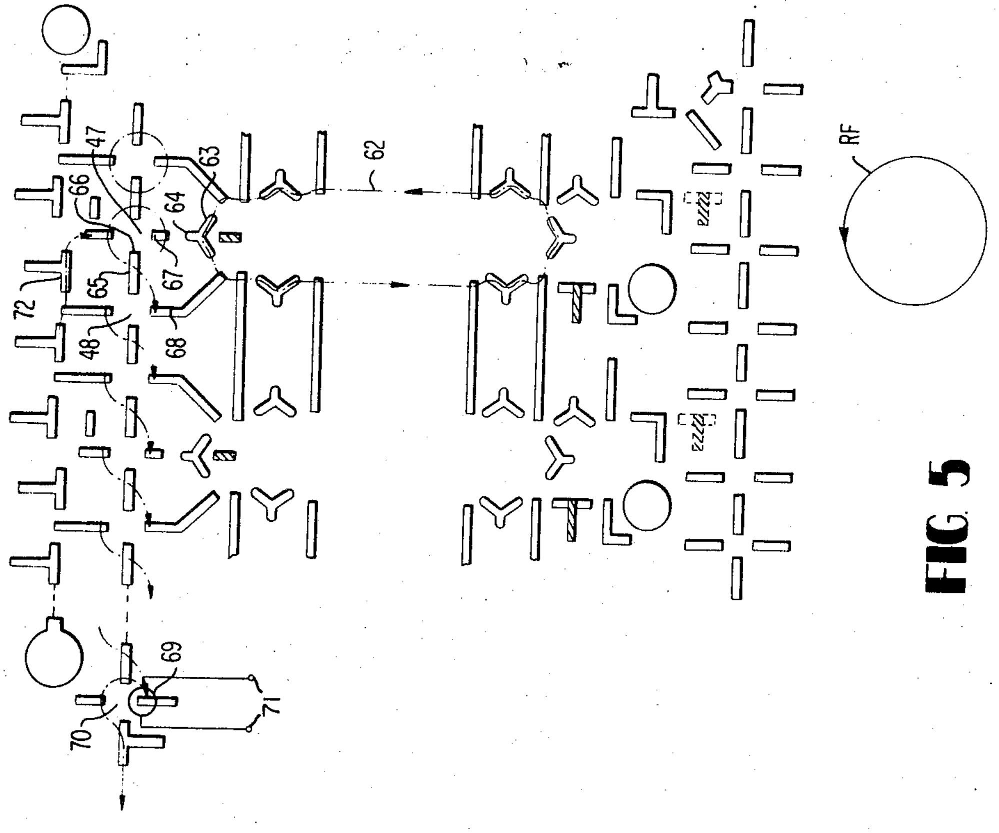
FIGS. 4 through 6 show practical diagrams for practically explaining the embodiment of the present invention using the T.I-bar system.
Figure 4:
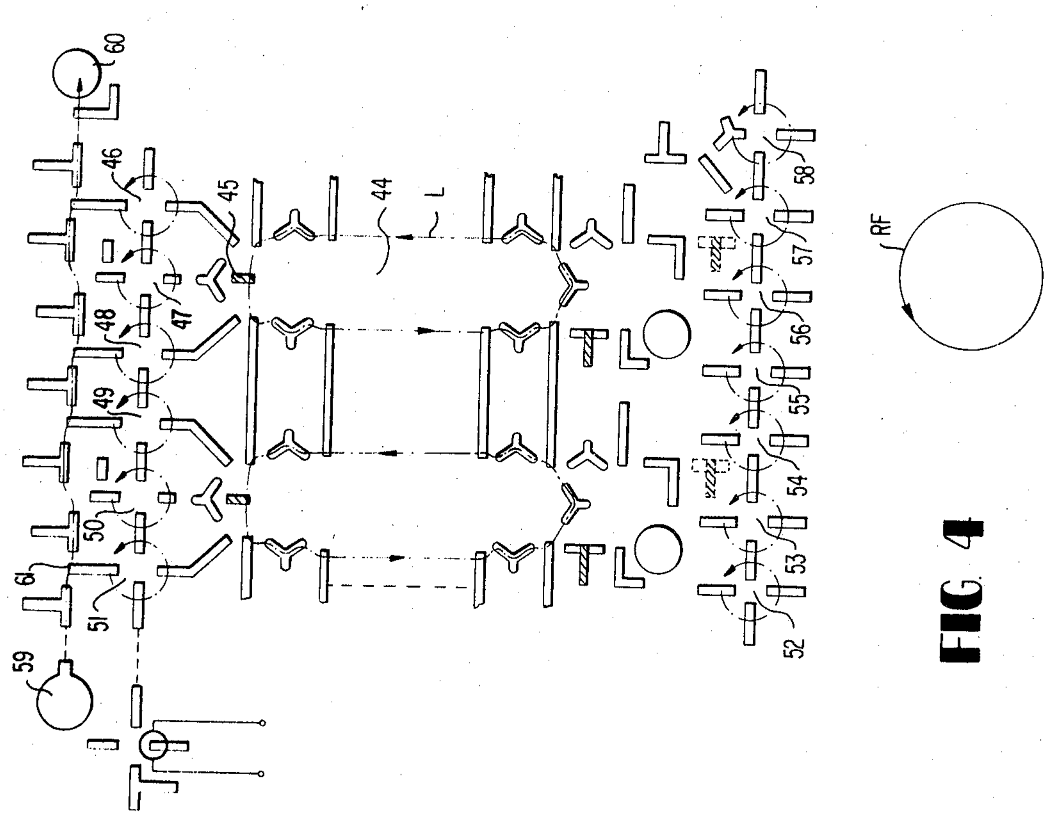
Figure 6:
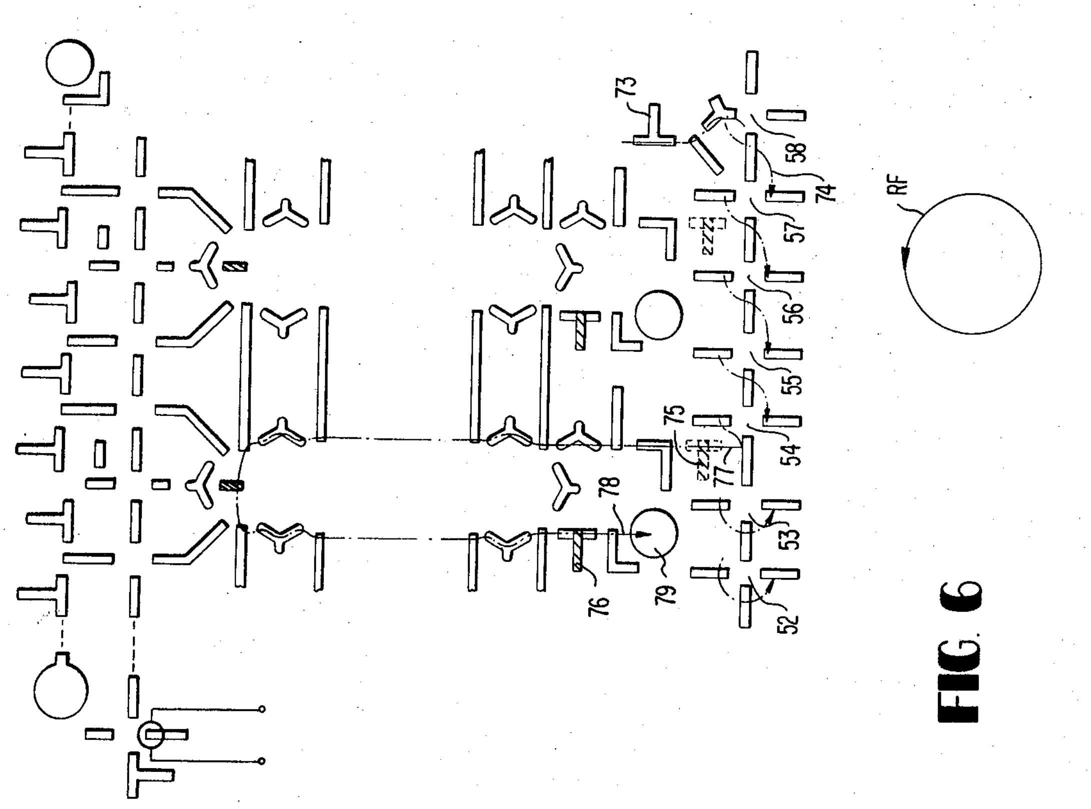

FIGS. 4 through 6 show diagrams for practically explaining the embodiment of FIG. 3, which is composed of T (or Y) and I-bars depending on the foregoing fundamental idea. The magnetic domain driving system of the T (or Y) I-bar system (hereinbelow termed the "T-bar system") is most commonly used. In the system, thin T-shaped (or Y-shaped) and I-shaped pieces consisting of soft magnetic materials (for example, thin permalloy pieces) are alternately disposed on a single crystal face for magnetic domains. When a rotating magnetic field within the crystal face is applied to them, magnetization at the ends of the thin pieces is successively changed. For this reason, the bubbles are attracted by the magnetization, and are moved along the arrangement of TI-patterns. These facts are described in the U.S. Pat. No. 3,534,347 issued on Oct. 13, 1970.

In FIG. 4, which shows a state for holding information, bubbles circulate within an information storing channel 44 constituted by Y and I bars along the dot-dash line L (it is now assumed that in any case, the rotating magnetic field is rotated counterclockwise as shown by an arrow RF). Numeral 45 represents a hard magnetic material film for use as the magnetic domain movement control switch, and it is previously magnetized, for example, so that when the top surface of the bubble is negatively magnetized, the lower part thereof is positive while the upper part is negative. As will be explained in connection with FIG. 7, the polarity of film 45 can be switched, but it is not influenced by the rotating magnetic field. Consequently, the bubble is normally passed through the lower part of the thin piece 45 as shown by the one dot and dash line. Although not related to storage and holding operation, bubbles are present in small closed magnetic paths 46, 47 . . . and 58. When the external rotating magnetic field is applied, they rotate along passages shown by circles of one dot and dash lines depending on every rotation of the rotating magnetic field. At every rotation of the rotating magnetic field, one bubble is generated from a magnetic domain generating source 59, and arrives through a passage 61 of a dot and dash line at a magnetic domain absorbing source 60 to be extinguished thereat.

FIG. 5 shows the moving process of the bubbles when the upper and lower parts of piece 45 are magnetized positive and negative, i.e., the read switch is actuated. In this case, the passage of the bubble of the information storing channel is altered as illustrated by the dot and dash line 62. Herein, when the bubble has come to a pointed end 64 of a Y-bar (Y-pattern) 63, the domain in the path 47 leaves the right end of an I-bar 65 (I-pattern) and is just going to move to an I-bar 67. However, since the bubble is present in the neighborhood of the I-bar 67 or, in other words, at the upper part of the Y-bar 64, the bubble at a point 66 leaps to a left lower I-bar 68 and is moved to the path 48. By such an operation, the bubble sequentially moves to the next path, and is finally pushed out to a small closed magnetic path 70 having a magnetic domain detecting means 69. Thus, an output voltage is obtained across terminals 71 of the detecting means 69. As is apparent from this practical example, the bubbles which have come to the Y-bar 64 in the channel are not affected by the read-out operation, and continue to circulate within the loop 62.

As will be apparent from the foregoing, the bubble of the path 47 is exhausted to be vacant by the above-mentioned operation. Therefore, even if another bubble comes to the bar 64 subsequently, the repelling operation is not performed. To avoid the condition, the bubble passing along the path 61 as shown in FIG. 4 is supplied within one rotation of the rotating magnetic field along a course as shown by the dot-dash line 72 in FIG. 5 to the path 47. As a result, sequential operation is achieved.

In FIG. 6 which shows a diagram for explaining the information write-in operation, when a bubble is introduced from an inlet for bubbles shown by numeral 73, the bubble of the path 58 is moved to the adjacent path 57 as illustrated by an arrow 74. As a result, the bubble is sequentially moved in such a way that the bubble of the path 57 is moved to the adjacent path 56.

Now, if hard magnetic material pieces 75 and 76, for use as the write and erase magnetic domain movement control switches have been previously magnetized so as to attract bubbles, a bubble in the small closed magnetic path 54 which has been pushed by the bubble entered from the path 55 does not go to the path 53, but it is moved as shown by a dot-dash line 77, upon receipt of an attractive force of the hard magnetic piece 75. On the other hand, a bubble already present in the information storing channel is conducted, via the hard magnetic material piece 76, to an absorbing source 79 as shown by an arrow 78 and disappears thereat. If the magnetization of the hard magnetic material pieces are reversed when the new information has been entered, the lines 77 and 78 are closed and the information is held. As is also apparent in this case, the bubble which has entered into the inlet 73 for bubbles pushes instantly the bubble from the path 54 to the piece 75, and the information is introduced without any loss of time.

Figure 7:
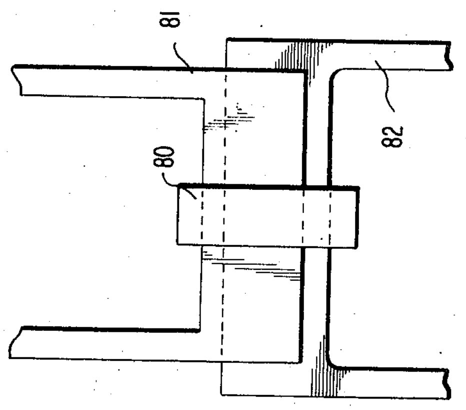
FIG. 7 shows one example of a magnetic domain movement control switch used in the present invention.

FIG. 7 shows one example of the switches 14, 17, 38, 39, 40, 41 and 42 made of a hard magnetic piece. The switches used in the foregoing embodiment operate only when corresponding X- and Y-lines are selected in response to the read-out, write-in and erase operations, the latter two typically being carried out simultaneously. For this reason, the following construction is adopted as one example. Two conductor pieces 81 and 82 to which currents are applied are disposed at right angles with a hard magnetic material piece 80. It is now assumed that the coercive force of the piece 80 is $H_c$, and that the magnitudes of the magnetic fields generated by the currents flowing through the conductor pieces 81 and 82 are $H_1$ and $H_2$, respectively. Then, if $H_c$, $H_1$ and $H_2$ are selected so that $H_c > H_l$, $H_c > H_2$ and $H_c < H_1 + H_2$, the magnetized state of the hard magnetic piece 80 is not switched when the current pulse is caused to flow through either conductor piece, and it is switched only when the current pulses are supplied to both the conductor pieces concurrently. Also, if $H_c$ is held larger than the rotating magnetic field, the magnetization of the piece 80 is never inverted by the field, and the switch operation is normally continued.

The invention has so far been described in conjunction with specific embodiments. It will apparent however, that a number of alternatives and modifications can be made within the scope of the present invention as defined by the appended claims.

What is claimed is:

1. A cylindrical magnetic domain memory apparatus for storing information by the presence or absence of magnetic bubbles, comprising, a. a sheet of magnetic material of the type capable of retaining magnetic bubbles therein, b. a plurality of storage channel means on said sheet for circulating stored bubbles in response to an applied rotating magnetic field, c. an arrangement of thin film patterns on said sheet adapted to retain bubbles at closely packed positions adjacent said storage channels, said arrangement constituting a read-out channel packed with bubbles which are present along a predetermined direction in said read-out channel and which are moved in said predetermined direction when a bubble in the read-out channel adjacent a selected one of said storage channels is moved in said direction due to a repulsive force provided by a stored bubble reaching a predetermined position of any of said storage channels, d. bubble detecting means adjacent said read-out channel for detecting a bubble when one is applied thereto, said detecting means being positioned to receive the nearest bubble in said read-out channel when the bubbles present along said predetermined direction in said read-out channel are moved due to said repulsive force, e. a plurality of first magnetic switching means, associated respectively with each said storage channel, for altering the path of bubbles in a storage channel, when said associated magnetic switch is switched to a second state to cause said bubbles to reach a position in said storage channel sufficiently near said read-out channel to create the repulsive force required to cause movement of said bubbles in said read-out channel, f. means for replacing bubbles in said read-out channel to refill said read-out channel, and g. control means for selectively switching said first plurality of magnetic switches to said second state.

2. A cylindrical magnetic domain memory as claimed in claim 1 further comprising, a. a write-in channel comprising a plurality of thin film patterns on said sheet adapted to retain bubbles at closely packed positions adjacent said storage channels, b. a plurality of second magnetic switching means associated with each storage channel respectively, each of said second switching means being positioned between said write-in channel and one storage channel for transferring an adjacent bubble from said write-in channel to said storage channel when said switching means is in a second magnetic state and a repulsion force is applied to said string of bubbles in said write-in means, and c. information writing control means for entering a bubble at one end of said write-in channel to create said repulsive force and for selectively switching said plurality of second magnetic switches to said second magnetic state.

3. A cylindrical magnetic domain memory as claimed in claim 2 further comprising, a. a plurality of bubble erasing means, associated with said storage channels, for destroying bubbles applied thereto, b. a third plurality of magnetic switch means, associated with each storage channel, respectively, for transferring a circulating bubble in said storage channel to said erasing means when said third switch means is in a second magnetic state, and c. control means for selectively causing said plurality of third magnetic switches to switch to said second state.

4. A cylindrical magnetic domain memory as claimed in claim 3 wherein each said storage channel comprises an arrangement of thin film patterns positioned to form a closed loop, said patterns being of the type which experience magnetic polarity changes in response to a rotating magnetic field to cause bubbles stored therein to move from point to point on a pattern and from a point on one pattern to a point on a adjacent pattern as said field direction changes.

5. A cylindrical magnetic domain memory as claimed in claim 4 wherein said first plurality of magnetic switches comprises a plurality of thin film magnetized patterns, each of which changes polarity in response to an applied magnetic field greater than that provided by said rotating magnetic field.

6. A cylindrical magnetic domain memory as claimed in claim 5 wherein said second plurality of magnetic switches comprises a plurality of thin film magnetized patterns, each of which changes polarity in response to an applied magnetic field greater than that provided by said rotating magnetic field.

7. A cylindrical magnetic domain memory as claimed in claim 6 wherein said third plurality of magnetic switches comprises a plurality of thin film magnetized patterns, each of which changes polarity in response to an applied magnetic field greater than that provided by said rotating magnetic field.

8. A cylindrical magnetic domain memory as claimed in claim 7 further comprising additional sheets of magnetic material of the type capable of retaining magnetic bubbles therein, each said sheet having arrangements of thin film patterns substantially the same as said first sheet forming corresponding storage channels, read-out channels, write-in channels, first, second and third plurality of magnetic switches, and wherein said control means for said first, second and third plurality of magnetic switches on all said sheets of magnetic material comprises a coordinate system of current carrying wires arranged to provide selective switching of said magnetic switches to thereby cause read-out from a selective storage channel, write-in to a selected channel and erasure of information in a selected channel.

9. A cylindrical magnetic domain memory apparatus comprising a sheet of magnetic material capable of retaining cylindrical magnetic domains; a plurality of information storing channels which are arranged on the sheet of magnetic material and each of which consists of a first predetermined arrangement of thin film patterns for forming a path for causing cylindrical magnetic domains corresponding to storage information to normally and successively circulate within a loop; means for generating a magnetic field rotating within a plane of the sheet of magnetic material in order to cause the magnetic domains to normally circulate within the loops of the plurality of information storing channels; a magnetic domain transfer line which is arranged on the sheet of magnetic material, which is common to the channels, and which consists of second and third predetermined arrangements of thin film patterns, each of the arrangements forming a row and normally retaining cylindrical magnetic domains, means for applying a cylindrical magnetic domain to the third predetermined arrangement of thin film patterns simultaneously when one of the domains disappears; and write-in and read-out means for introducing cylindrical magnetic domains corresponding to desired information into desired one of the information storing channels, and for reading out magnetic domains corresponding to the information from the desired one of the channels, whereby simultaneously when one magnetic domain to be written in is applied in response to a write-in operation of the write-in means to the thin film pattern at one end of said second predetermined arrangement of thin film patterns forming the magnetic domain transfer line, the domain to be written in is introduced into the desired channel due to a repulsion between the domain present at said thin film pattern at the one end and the domain to be written in, and whereby as soon as one cylindrical magnetic domain to be read out is supplied in response to a read-out operation of the read-out means from the desired channel to the vicinity of a thin film pattern among said third predetermined arrangement of thin film patterns which is located at a position corresponding to the desired channel, the domain is read out from the desired channel into the read-out means due to a repulsion between the domain to be read out and the domain present at the thin film pattern at said position corresponding to the desired channel.

10. A cylindrical magnetic domain memory apparatus having a plurality of memories according to claim 9 arranged in a stack form, each said memory having said sheet of magnetic material, including a plurality of switch means forming a matrix and providing corresponding to the respective information storing channels of the respective sheets in order to select a desired information storing channel on a predetermined sheet in response to the write-in and read-out operations by the write-in and read-out means, respectively, and switch selecting means for selecting desired one of the plurality of switch means in the matrix form in response to the write-in and read-out operations.

* * * * *